United States Patent
Cavanagh

(10) Patent No.: US 8,438,938 B1
(45) Date of Patent: May 14, 2013

(54) LOAD CELL

(75) Inventor: Kenneth M Cavanagh, Warwick, RI (US)

(73) Assignee: Parkinson Technologies, Inc., Woonsocket, RI (US)

( * ) Notice: Subject to any disclaimer, the term of this patent is extended or adjusted under 35 U.S.C. 154(b) by 240 days.

(21) Appl. No.: 12/857,640

(22) Filed: Aug. 17, 2010

Related U.S. Application Data

(60) Provisional application No. 61/238,719, filed on Sep. 1, 2009.

(51) Int. Cl.
*G01L 1/22* (2006.01)
*G01L 3/02* (2006.01)

(52) U.S. Cl.
USPC ............ 73/862.629; 73/862.638; 73/862.191; 73/862.045; 73/862.338

(58) Field of Classification Search ....... 73/862.041–862.046, 862.331–862.335
See application file for complete search history.

(56) References Cited

U.S. PATENT DOCUMENTS

| | | | |
|---|---|---|---|
| 4,099,409 A | 7/1978 | Edmond | |
| 4,259,863 A * | 4/1981 | Rieck et al. | 73/862.041 |
| 4,723,450 A * | 2/1988 | Coulter | 73/862.191 |
| 4,958,525 A | 9/1990 | Hauer et al. | |
| 5,513,536 A * | 5/1996 | Reger et al. | 73/862.191 |
| 5,589,828 A * | 12/1996 | Armstrong | 341/20 |
| 5,925,832 A * | 7/1999 | Bruns | 73/862.635 |
| 6,220,105 B1 | 4/2001 | Cripe | |
| 6,370,971 B1 | 4/2002 | Olson | |
| 6,711,960 B2 * | 3/2004 | Kobayashi et al. | 73/862.629 |
| 7,679,009 B2 * | 3/2010 | Weichao | 177/211 |
| 7,947,912 B2 * | 5/2011 | Weichao | 177/211 |
| 8,161,828 B1 * | 4/2012 | Clegg et al. | 73/862.338 |
| 2011/0314935 A1 * | 12/2011 | Krippner et al. | 73/862.045 |

* cited by examiner

*Primary Examiner* — Lisa Caputo
*Assistant Examiner* — Jonathan Dunlap
(74) *Attorney, Agent, or Firm* — Gesmer Updegrove LLP

(57) ABSTRACT

A load cell in accordance with the present invention comprises an insert defining a hub having a central opening dimensioned to receive a shaft. The insert is removably fixed to the shaft, and a cylindrical sleeve is configured and dimensioned to surround the insert. The sleeve is machined with interior notches. The insert is suspended and rotatably fixed within the sleeve by flanges which are integral with and project from the insert's hub into the sleeve's interior notches. The flanges are configured to respond with deformation to forces applied to the shaft, and strain gauges bonded to the flanges exhibit changes in resistance according to the degree of flange deformation.

1 Claim, 2 Drawing Sheets

LOAD CELL

CROSS REFERENCE TO RELATED APPLICATIONS

This application claims priority from Provisional Application Ser. No. 61/238,719 filed on Sep. 1, 2009.

FIELD OF THE INVENTION

This invention relates to load cells used in measuring forces applied to shafts, including both rotating shafts and non-rotating so called "dead" shafts.

BACKGROUND DISCUSSION

Load cells for measuring forces exerted on shafts are known, as evidenced for example by the disclosures in U.S. Pat. Nos. 4,099,409 (Edmond); 4,958,525 (Hauer et al); 6,220,105 (Cripe); and 6,370,971 (Olson). A drawback with these known devices is their lack of compactness, which precludes their use in confined spaces. Such devices also have unduly complex structures, which are difficult to machine and assemble, all of which contributes to disadvantageously high costs.

Accordingly, a primary objective of the present invention is the provision of a load cell having a compact structure, making it useful in confined spaces that are often found in modern day equipment designs.

A companion objective of the present invention is the provision of a load cell designed for ease of machining and assembly, thus reducing manufacturing costs.

SUMMARY OF THE INVENTION

A load cell in accordance with the present invention comprises an insert defining a hub having a central opening dimensioned to receive a shaft. The insert is removably fixed to the shaft, and a cylindrical sleeve is configured and dimensioned to surround the insert. The sleeve is machined with interior notches. The insert is suspended and rotatably fixed within the sleeve by flanges which are integral with and project from the insert's hub into the sleeve's interior notches. The flanges are configured to respond with deformation to forces applied to the shaft, and strain gauges bonded to the flanges exhibit changes in resistance according to the degree of flange deformation.

These and other features and attendant advantages of the present invention will now be described in further detail with reference to the accompanying drawings, wherein:

DETAILED DESCRIPTION

Figure 1:
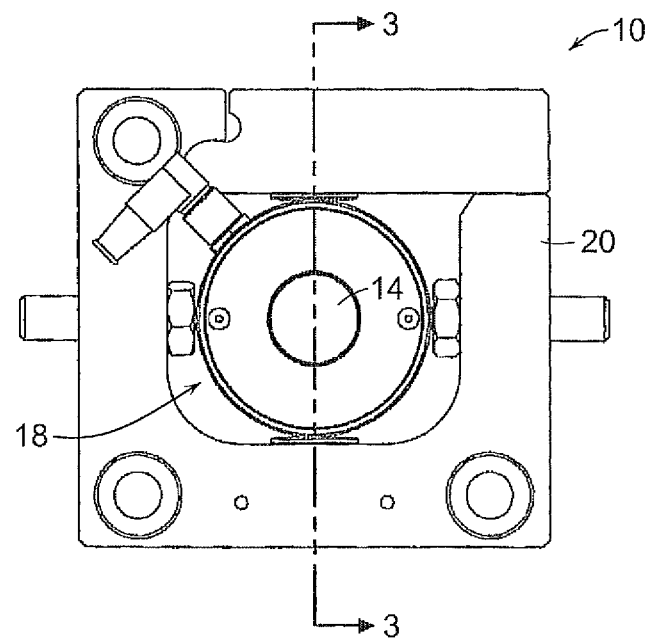
FIG. 1 is a front view of a load cell in accordance with a preferred embodiment of the present invention.
Figure 2:
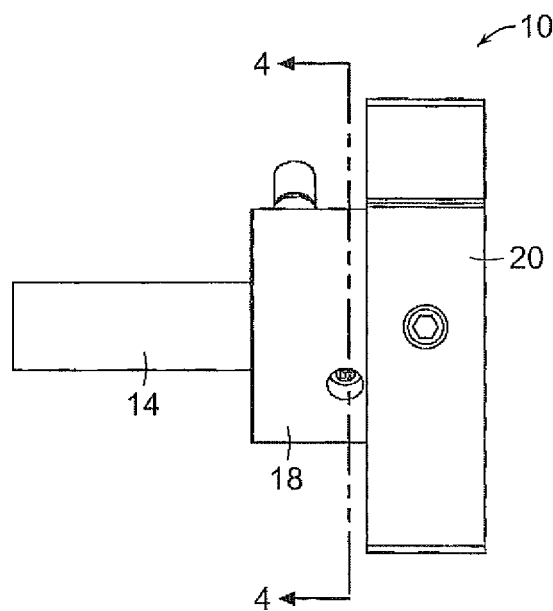
FIG. 2 is a side elevational view of the load cell.
Figure 3:
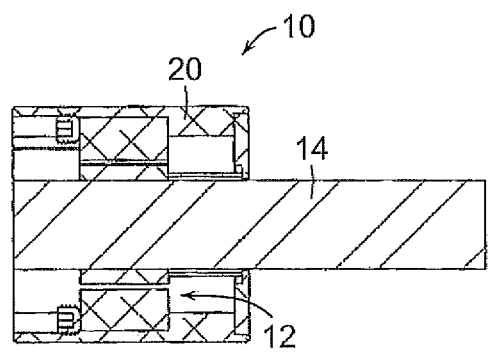
FIG. 3 is a sectional view taken along line 3-3 of FIG. 1.
Figure 4:
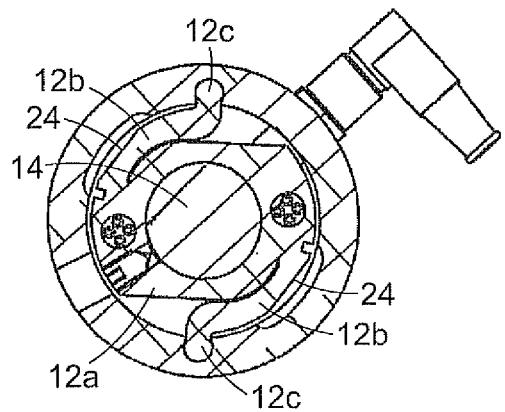
FIG. 4 is a sectional view taken along line 4-4 of FIG. 2.
Figure 5:
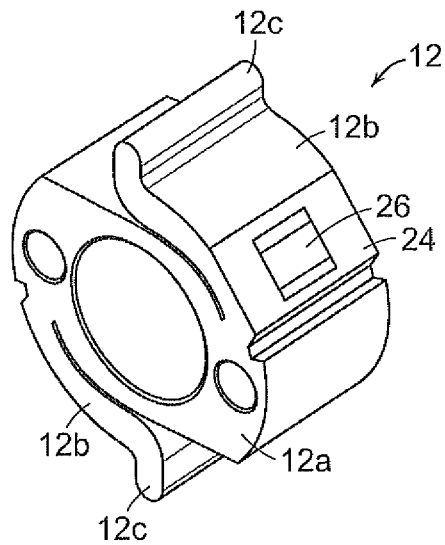
FIG. 5 is a perspective view of the insert component.

With reference to the above drawings, a load cell 10 includes an insert 12 defining a hub 12*a* with a central opening dimensioned to receive a shaft 14. A set screw 16 or other equivalent means serves to rotatably fix the insert to the shaft.

A cylindrical sleeve 18 is configured and dimensioned to surround and enclose the insert 12. The sleeve 18 is adjustably mounted within an outer housing 20.

The insert 12 is suspended and rotatably fixed within the sleeve by flanges 12*b* which are integral with the hub 12*a*.

The flanges have intermediate sections curving back towards the hub and then radially outwardly to form distal ribs 12*c* received in grooves in the interior surface of the sleeve. The intermediate flange sections have flat outer surfaces 24 on which are bonded strain gauges 26. The flanges 12*b* are configured to respond with deformation to forces applied to the shaft 14, with the strain gauges exhibiting changes in resistance according to the degree of flange deformation.

The load cell is advantageously compact in size due in large measure to the unique configuration of the flanges 12*b* and their close confinement within the sleeve 18.

The major components of the load cell are configured for ease of machining and assembly.

What is claimed is:

1. A load cell for measuring forces applied to a shaft, said load cell comprising:
   an insert defining a hub having a central opening dimensioned to receive said shaft;
   means for fixing said insert to said shaft;
   a cylindrical sleeve configured and dimensioned to surround said insert, said sleeve having interior notches, and said insert being suspended and rotatably fixed within said sleeve by flanges integral with and projecting from said hub into said notches, said flanges being configured to respond with deformation to forces applied to said shaft and having flat outer surfaces facing away from said central opening; and
   strain gauges bonded to said flat outer surfaces, said strain gauges exhibiting changes in resistance according to the degree of deformation of said flanges, and wherein said flanges have intermediate sections curving towards said central opening, and rims projecting radially outwardly from said central opening into said notches, said flat outer surfaces being on said intermediate sections.

* * * * *